United States Patent
Huynh et al.

(10) Patent No.: US 8,931,054 B2
(45) Date of Patent: Jan. 6, 2015

(54) SECURE ACCESS TO SHARED STORAGE RESOURCES

(71) Applicant: International Business Machines Corporation, Armonk, NY (US)

(72) Inventors: Khoa D Huynh, Round Rock, TX (US); Rezaul S Islam, Tucson, AZ (US); Badari Pulavarty, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 13/781,167

(22) Filed: Feb. 28, 2013

(65) Prior Publication Data

US 2014/0006708 A1    Jan. 2, 2014

Related U.S. Application Data

(63) Continuation of application No. 13/536,510, filed on Jun. 28, 2012, now abandoned.

(51) Int. Cl.
*H04L 29/06* (2006.01)
*G06F 3/06* (2006.01)

(52) U.S. Cl.
CPC ............ *G06F 3/0622* (2013.01); *G06F 3/0689* (2013.01)
USPC .................. 726/3; 709/3; 709/211; 707/802; 707/827; 711/6; 711/112; 711/114; 380/44

(58) Field of Classification Search
CPC ............................. H04L 63/08; G06F 9/45533
USPC .......................................................... 726/3
See application file for complete search history.

(56) References Cited

U.S. PATENT DOCUMENTS

| | | | |
|---|---|---|---|
| 5,379,391 A | 1/1995 | Belsan et al. | |
| 5,403,639 A | 4/1995 | Belsan et al. | |
| 5,742,792 A | 4/1998 | Yanai et al. | |
| 6,260,068 B1 * | 7/2001 | Zalewski et al. | 709/226 |
| 6,633,916 B2 * | 10/2003 | Kauffman | 709/229 |

(Continued)

FOREIGN PATENT DOCUMENTS

| | | |
|---|---|---|
| CN | 1506840 | 6/2004 |
| WO | WO03088049 | 10/2003 |

OTHER PUBLICATIONS

Object-Based Storage|http://www.storagevisions.com/White%20Papers/MesnierIEEE03.pdf|Mesnier et al.| pp. 84-90| Aug. 2003.*

(Continued)

*Primary Examiner* — Mahfuzur Rahman
(74) *Attorney, Agent, or Firm* — VanLeeuwen & VanLeeuwen; Damion C. Josephs

(57) ABSTRACT

A method may comprise storing first storage information in a storage device of a computer storage system on a first network. The computer storage system may transform the first storage information into a first virtual storage instance, provide access to the first virtual storage instance on a second network not in communication with the first network and the storage device, and enable over the second network the modification of the first virtual storage instance to create a first modified virtual storage instance. The computer storage system may also transform the first modified storage instance into first modified storage information based on the first modified storage instance, and store on the storage device the first modified storage information.

24 Claims, 7 Drawing Sheets

(56) References Cited

U.S. PATENT DOCUMENTS

| | | | | |
|---|---|---|---|---|
| 6,944,699 | B1* | 9/2005 | Bugnion et al. | 710/269 |
| 7,360,034 | B1* | 4/2008 | Muhlestein et al. | 711/148 |
| 7,383,381 | B1* | 6/2008 | Faulkner et al. | 711/114 |
| 7,389,379 | B1 | 6/2008 | Goel et al. | |
| 7,519,769 | B1* | 4/2009 | Kulkarni et al. | 711/114 |
| 7,685,281 | B1* | 3/2010 | Saraiya et al. | 709/226 |
| 7,739,447 | B1 | 6/2010 | Rodrigues | |
| 8,230,085 | B2* | 7/2012 | Roa | 709/229 |
| 8,539,137 | B1 | 9/2013 | Protossav et al. | |
| 2002/0016812 | A1* | 2/2002 | Uchishiba et al. | 709/104 |
| 2002/0024964 | A1* | 2/2002 | Baum et al. | 370/419 |
| 2005/0120242 | A1 | 6/2005 | Mayer et al. | |
| 2008/0155169 | A1* | 6/2008 | Hiltgen et al. | 711/6 |
| 2010/0198972 | A1 | 8/2010 | Umbehocker | |
| 2010/0199037 | A1 | 8/2010 | Umbehocker et al. | |
| 2010/0235831 | A1* | 9/2010 | Dittmer | 718/1 |
| 2010/0250744 | A1 | 9/2010 | Hadad et al. | |
| 2010/0257536 | A1 | 10/2010 | Srinivasan | |
| 2011/0047195 | A1 | 2/2011 | Le et al. | |
| 2011/0072486 | A1 | 3/2011 | Hadar et al. | |
| 2011/0302219 | A1 | 12/2011 | Amit et al. | |
| 2012/0005673 | A1 | 1/2012 | Cervantes et al. | |
| 2013/0227236 | A1* | 8/2013 | Flynn et al. | 711/165 |
| 2014/0052864 | A1* | 2/2014 | Van Der Linden et al. | 709/226 |

OTHER PUBLICATIONS

Notice of Allowance for U.S. Appl. No. 13/536,510 (Huynh et al., "Secure Access to Shared Storage Resources," filed Jun. 28, 2012), United States Patent and Trademark Office, mailed Jan. 8, 2014, 13 pages.

Virtualization Special Interest Group PCE Security Standards Council, "Information Supplement: PCI DSS Visualization Guidelines," PCI Data Security Standard (PCI DSS), Version 2.0, Jun. 2011, 39 pages.

Vaibhav Khadilkar et al., Secure Data Storage and Retrieval in the Cloud, 2010, 8 pages.

Dr. Rao Mikkilineni et al., Cloud Computing and the Lessons from the Past, 2009, 6 pages.

Cisco Corporation, Secure Cloud Architecture, Aug. 2009, 23 pages, www.met-networks.com/documents/.../securecloudwhitepaper . . . .

Taneja Group Inc., Riverbed and EMC Delivery Capacity-Optimized Cloud Storage for Backup, Recovery, Archiving, and DR, Nov. 2010, 6 pages, www.tanejagroup.com.

IBM Corporation, Method of creating a componentized architecture unifying resources sharing scenarios in Cloud Computing environment, Feb. 11, 2010, 14 pages, http://priorartdatabase.com.

Peter Mell et al., The NIST Definition of Cloud Computing (Draft), Recommendations of the National Institute of Standards and Technology, Jan. 2011, 7 pages.

International Search Report and Written Opinion for Application PCT/CN2013/074103, mailed Jul. 18, 2013, 10 pages.

Office Action for U.S. Appl. No. 13/536,510 (Huynh et al., "Secure Access to Shared Storage Resources," filed Jun. 28, 2012), United States Patent and Trademark Office, mailed Aug. 2, 2013, 19 pages.

* cited by examiner

SECURE ACCESS TO SHARED STORAGE RESOURCES

CROSS-REFERENCE TO RELATED APPLICATION

This application is a continuation of U.S. patent application Ser. No. 13/536,510, filed Jun. 28, 2012, which is incorporated herein by reference in its entirety for all purposes.

BACKGROUND

Embodiments of the present disclosure generally relate to the field of data storage, and more particularly to secure access to shared storage in a networked environment.

SUMMARY

One or more embodiments of the present disclosure may include methods related to secure access to shared storage resources. According to an embodiment of the present disclosure, a method may comprise storing first storage information in a storage device of a computer storage system on a first network. The computer storage system may transform the first storage information into a first virtual storage instance, provide access to the first virtual storage instance on a second network not in communication with the first network and the storage device, and enable over the second network the modification of the first virtual storage instance to create a first modified virtual storage instance. The computer storage system may also transform the first modified storage instance into first modified storage information based on the first modified storage instance, and store on the storage device the first modified storage information.

BRIEF DESCRIPTION OF THE DRAWINGS

In order that the present disclosure will be readily understood, a more particular description will be rendered by reference to specific embodiments that are illustrated in the appended drawings. Understanding that these drawings depict only typical embodiments of the invention and are not therefore to be considered to be limiting of its scope, methods and systems will be described and explained with additional specificity and detail through the use of the accompanying drawings, in which.

DETAILED DESCRIPTION

Figure 1:
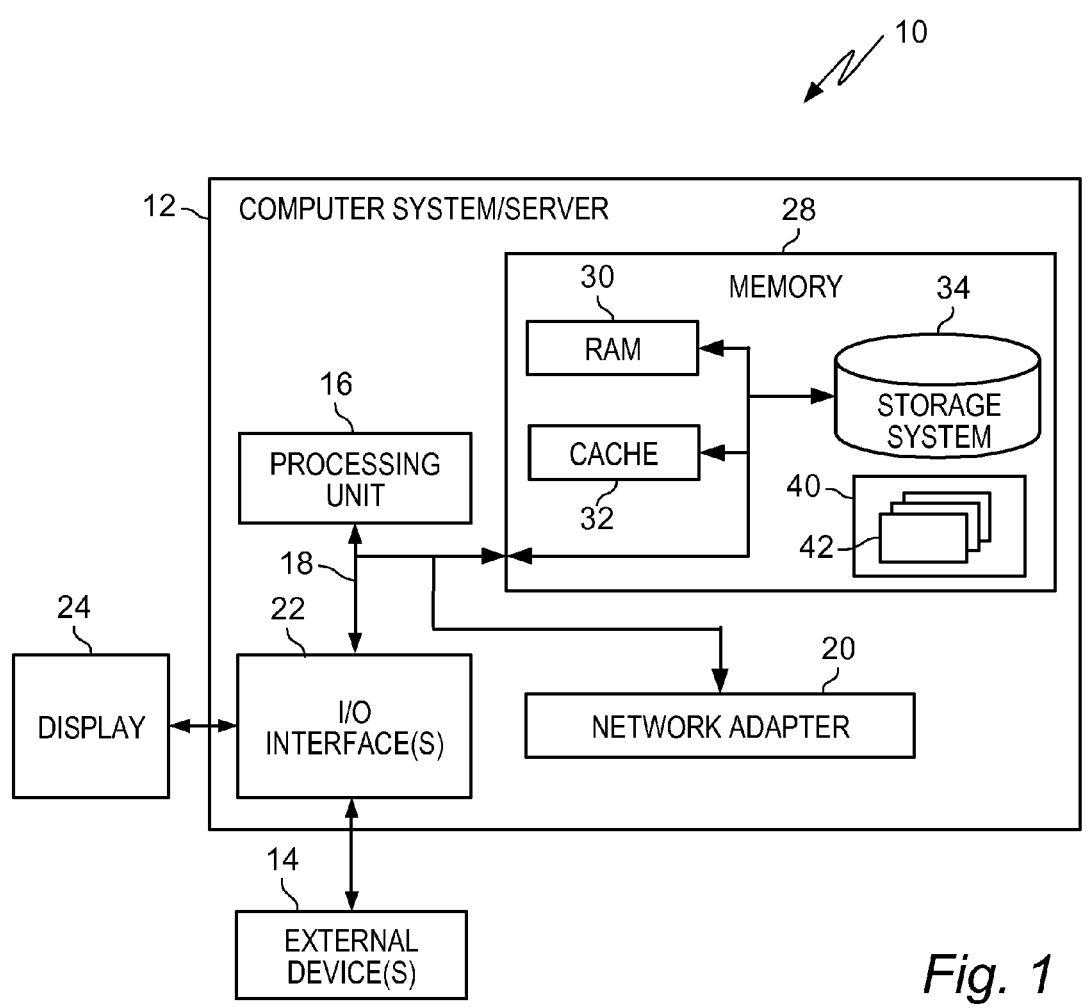
FIG. 1 depicts a cloud computing node according to an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention may be implemented in conjunction with any other type of computing environment now known or later developed, including a distributed environment like clusters of nodes in a network wherein a node represents an independently operating system.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic and/or solid state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Although not shown, removable or non-removable solid-state storage systems that employ, for example, flash or other semiconductor memory may be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 may be stored in a kernel of the operating system.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
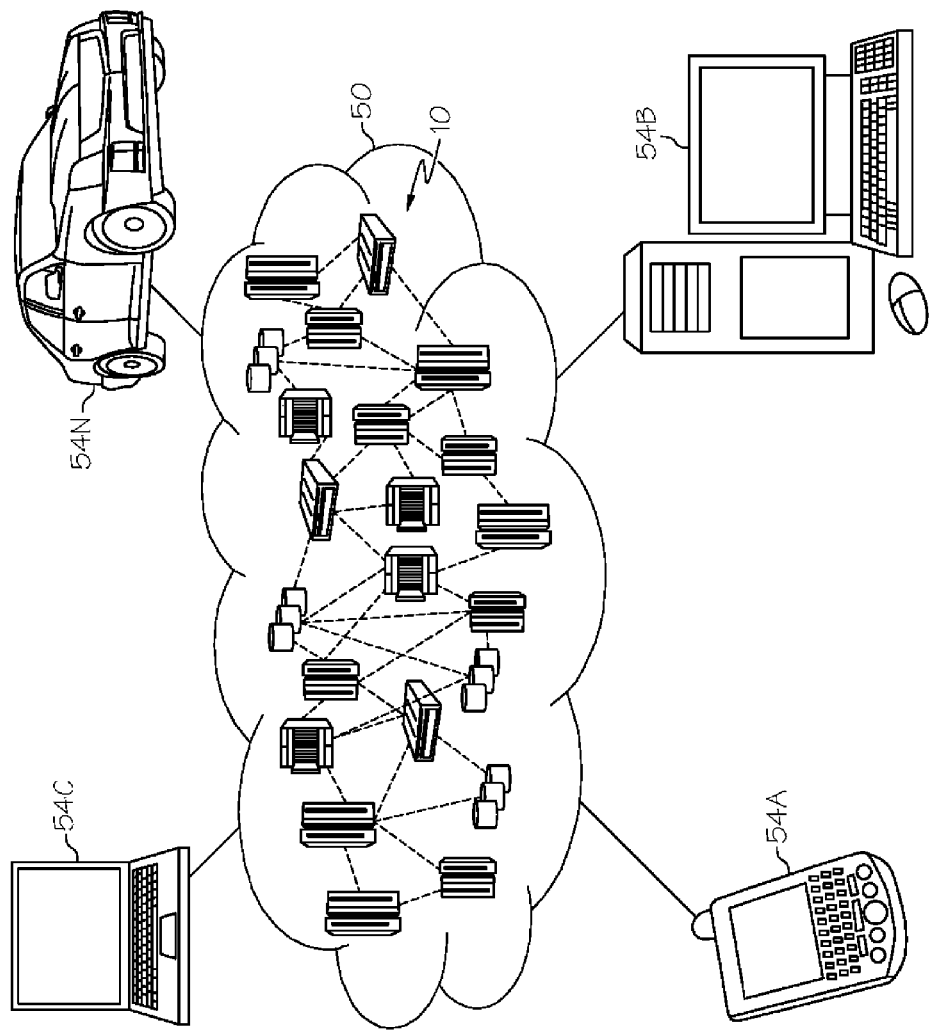
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). In FIG. 2 and elsewhere, the "A-N" notation may indicate an indefinite range, where "A" refers to a first item and "N" refers to a second, third, etc. or subsequent item.

Figure 3:
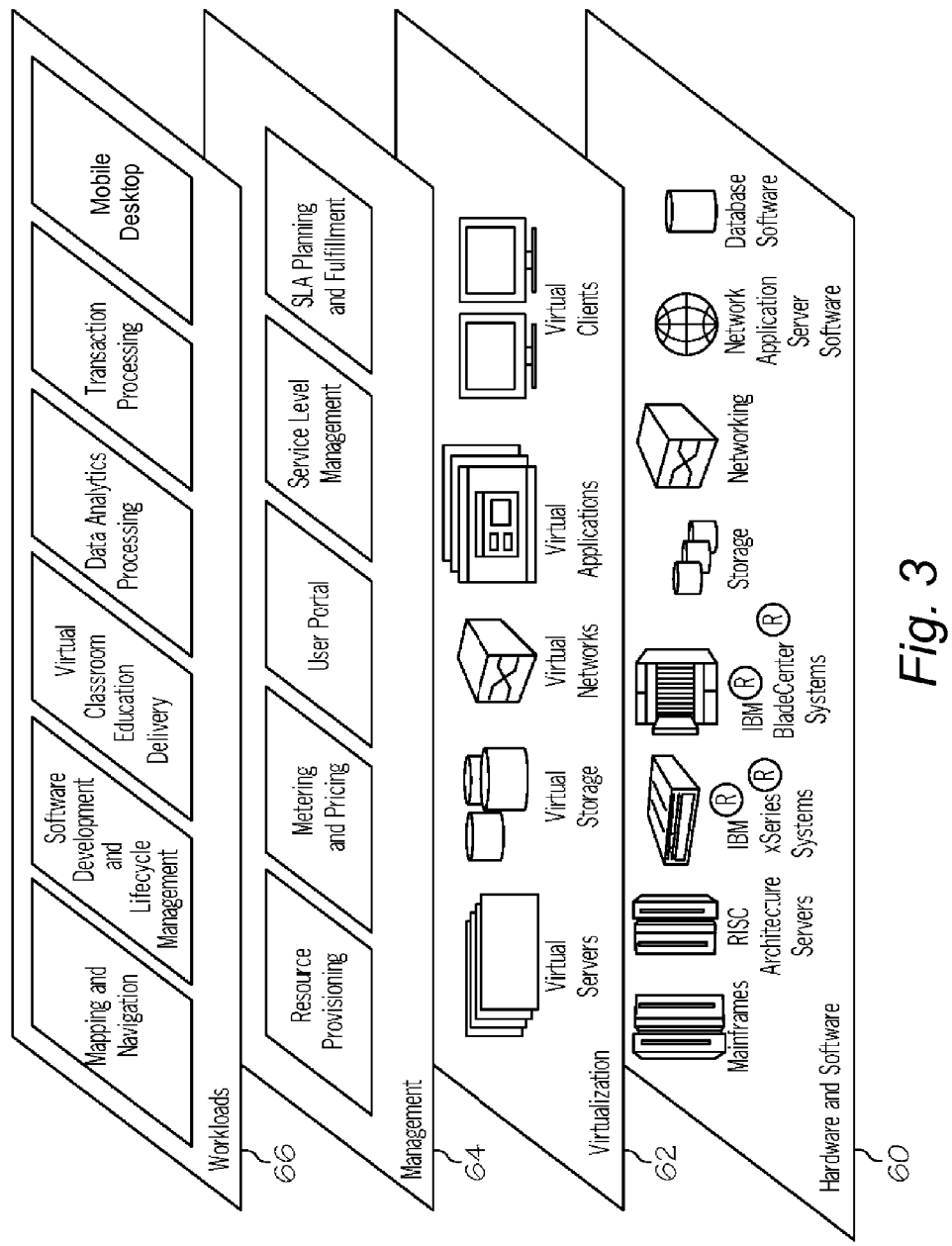
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification, such as login access, for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted above, systems, methods, and computer program products are disclosed herein for secure access to shared storage, such as storage provided by a cloud computing environment 50.

In a cloud environment 50, multiple users may share resources. For example, a service provider offering cloud-based services may provide hardware and/or software resources to multiple users—that is, to its customers—implemented by a common underlying infrastructure. The service provider's customers may be unrelated persons, businesses, governments, organizations, and other entities. The customer data processed and/or stored by the service provider may be private or proprietary. Protecting the security and privacy of that data is an essential aspect of providing cloud services. Accordingly, a cloud service provider seeks to isolate its customers from one another despite their use of the same underlying processing, memory, and storage resources. This isolation should be strong enough to protect against both accidental and deliberate intrusion.

Figure 4:
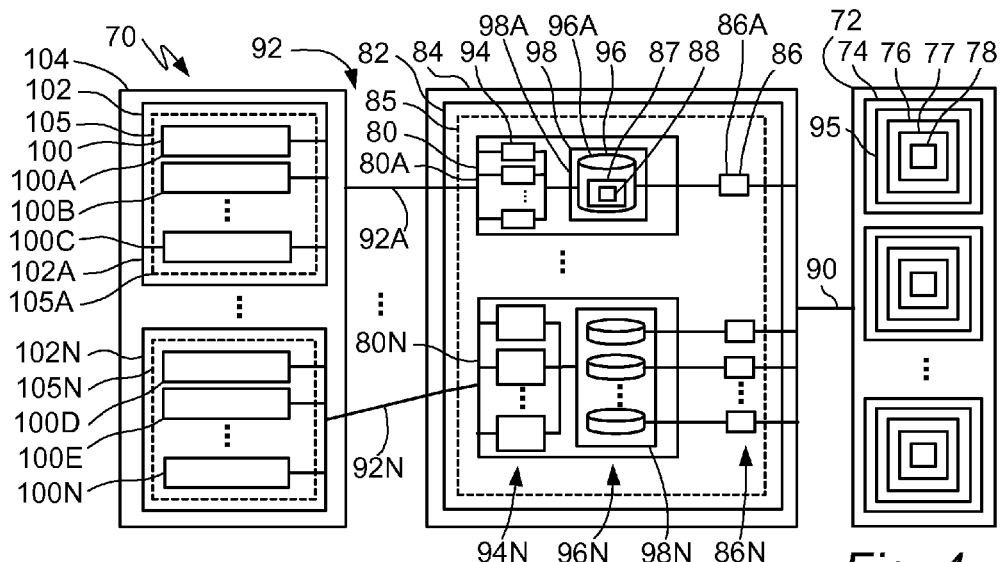
FIG. 4 depicts a representative embodiment of a system for accessing stored information according to the present invention.

Referring also to FIG. 4, a computer storage system for accessing stored information 70 or system 70 may comprise one or more storage systems 72, one or more virtual storage instances 80, one or more first networks 90, and one or more second networks 92. System 70 may further comprise one or more virtual machine instances 100. System 70 may be an example of a cloud computing environment 50 and may be an example of a hardware and software layer 60 and/or a virtualization layer 62. System 70 may include other, alternative, or additional elements, and may omit one or more elements.

Storage system 72 may comprise one or more storage devices 74, which are subsystems that provide actual hardware-level data storage. Storage system 72 may further comprise additional hardware and/or software elements, e.g., subsystems that control, manage, and/or support devices 74. For instance, a storage system 72 may include subsystems to balance computational and/or network loads among devices 74; to manage power consumption or environmental factors; and so on. System 72 may be in communication with some other elements of system 70, e.g., via first network 90. System 72 may be an example of Storage (shown included in hardware and software layer 60 of FIG. 3) and/or Virtual Storage (shown included in virtualization layer 62 of FIG. 3). System 72 may provide a means of offering a remote storage service, e.g., a cloud-based storage service. All or part of system 72 may reside in a facility selected to provide physical (lock and key) security, e.g., in a data center.

A storage device 74 may be any device that provides persistent storage of data. A device 74 may comprise one or more data storage drives, which are lower-level components that provide actual bit-, block-, and file-level storage. Examples of data storage drives include, but are not limited to, hard disk drives, solid-state drives, tape storage devices, and/or optical storage devices. For example, a storage device 74 may be or comprise one or more file servers, direct attached storage (DAS) devices, storage area network (SAN) devices, and/or attached storage (NAS) devices, each containing one or more data storage drives. Examples of storage devices 74 include IBM® Scale Out Network Attached Storage (SONAS) devices; IBM XIV Storage System devices; and IBM Storwize® V7000 devices. A storage device 74 may include or implement logical or organizational features such as logical disks, volumes, partitions, file systems, directories; data files, and/or data blocks. A storage device 74 may be or may comprise one or more data storage drives and/or one or more arrays of drives. An example of a drive array is a Redundant Array of Independent Disks (RAID), which combines multiple logical or physical drives into a single logical drive, e.g., to reduce access times and/or increase reliability.

Storage system 72 may implement logical storage devices by means of physical storage devices. A physical storage device with four partitions, for example, may function as four logical storage devices, one for each partition. In this disclosure, the phrase "storage device" includes both physical and logical storage devices. A storage device 74 accordingly may be a physical device or a logical device, e.g., a partition or logical drive.

Storage information 76 may be any data stored on one or more storage devices 74. For example, storage information 76 may comprise a single file or block stored in computer storage system 72; or a set of files or blocks; or a portion of a file system, e.g., one or more directories; or a logical disk or disk array; or a partition, slice, or volume, e.g., a partition associated with a particular owner (tenant), workgroup (subtenant), and/or user (guest) of system 70. Storage information 76 accordingly may contain not only the data as such but also its structure, storage units, and metadata. For example, storage information 76 may include one or more file systems associated with a particular tenant, the data files in the file systems, and related hierarchical structure such as file and directory structure, ownership, and access controls (permissions). In short, storage information 76 may be an image of any amount of organized data stored in storage system 72 and selected by some criterion, e.g., all data owned by a particular tenant, subtenant, or guest of system 70. An instance of storage information 76 may span multiple physical storage devices 74. For example, storage system 70 may allocate storage space such as a logical disk for a particular tenant, subtenant, or guest on more than one storage device 74. This allocation may be dynamic and may change over time. Storage information 76 accordingly may be the portion or division of the data currently stored on one or more devices 74, logically associated with a specified tenant, subtenant, or guest, and organized in a structure such as a file system. Changes to the content of the data, e.g., when a user (guest) changes a file or directory, are ultimately saved as corresponding changes to storage information 76.

Storage information 76 may include elements, subdivisions, or structures such as data files 78 and/or data file structures 77. A data file 78 is a resource for storing data in a file system of a storage device 74 and for making the data available for use by programs and systems. A data file 78 may have an identifying file name, an associated user name (e.g., a guest identifier), an associated group name (e.g., a tenant identifier), and other attributes. "File" in this disclosure refers generally to data that can be stored and includes block-level storage, file-level storage, and streaming data.

A data file structure 77 may be an association of one or more data files 78. For example, storage information 76 may include data files 78 associated in a file system that provides a hierarchical system of folders or directories. A directory may contain one or more data files 78 and/or subdirectories, which may themselves contain data files and/or subdirectories. This hierarchical structure is an example of a data file structure 77. More generally, a data file structure 77 may be any structural, logical, or organizational system, such as one or more partitions, volumes, slices, file systems, or directories included or implemented in storage information 76.

An instance of storage information 76 may be stored on storage system 72 as one or more storage files 95. Each storage file 95 may represent a complete instance of storage information 76 or a logical division of an instance of storage information 76. For example, a storage system 76 may include Redundant Array of Independent Disks (RAID). A RAID may function a logical storage device and may distribute data across an array of disks in one of several configurations (levels) to improve speed (e.g., by parallel I/O to multiple disks), reliability (e.g., by redundancy and/or parity), or both. Segmenting data across multiple disks for parallel access may be referred to as striping. Striping slices the data into logical strips, e.g., one strip per disk in the array. An instance of storage information 76 may be sliced into strips, e.g., to expedite creating a RAID to store the storage information. Each slice may be an example of a storage file 95. Striped storage files 95 may map to an actual logical or physical RAID in storage system 72 or may be otherwise selected.

Storage system 72 and/or any of its storage devices 74 may be a shared resource. For example, a service provider offering cloud-based storage via storage system 72 may have multiple users. Each user may have an account with the service provider, and through that account may store, retrieve, save, and otherwise manipulate data on system 72. A service provider hosting multiple users may allocate a portion of system 72 to each user. Data stored by different users may reside in the same system 72 and may reside on the same storage devices 74. Each user may regard his or her data as private and confidential. The service provider therefore may seek to provide isolation between users. This isolation may protect mutual privacy and security by granting each user exclusive access to private data owned by that user and by denying access by any user to private data owned by a different user. System 72 may be configured to allow each user access only to authorized data and to prevent accidental or intentional intrusion on unauthorized data. Mechanisms for protecting privacy in conventional multi-user systems include partitions, file systems, permissions systems, and physically separating the storage of one user from the storage of all other users. For example, dedicating a first storage device 74 to a first user and a second storage device 74 to a second user physically isolates the storage of the first user from the second user. Conventional shared storage does not provide physical separation between each user and the underlying storage devices, creating a risk that one user may intrude on another within shared storage system 72.

A service provider or other operator of system 70 may define associations among users. An individual user sometimes may be referred to as a guest, and a group or association of users sometimes may be referred to as a tenant. A guest may be a person or entity authorized to access system 70; or a guest may be a service, process, application, or other automated function authorized to access system 70. A guest may have an associated account, identifier, name, password, privileges, and other attributes. A tenant may be any natural, logical, or arbitrary group of guests and may have an associated account, identifier, name, subdivisions (subtenants), and other attributes. For example, a tenant may be named group defined by the operator as an administrative convenience. For another example, a tenant may correspond to a natural unit such as an individual, institution, business, organization, or government that obtains storage services from system 70. For instance, a service provider may have multiple customers, each a business with multiple employees. Each business may have an associated tenant account, and each of its employees may have a guest account associated with that tenant account. Each tenant may control or govern its associated guest accounts, e.g., by permitting or denying access by selected guests to selected data files 78 and/or data file structures 77. For example, a business (tenant) may grant all of its employees (guests) permission to read and write all data owned by the business; or a business may limit access to certain data to certain employees. An individual user may have authorized access to more than one guest account, and a guest account may have more than one authorized user. The word "owner" may sometimes refer to either a tenant or a guest, e.g., in contexts that apply to either or both.

Specified resources of system 70 may be associated with specified tenants and/or guests. From the system perspective, a particular tenant may be viewed as a collection of resources associated with that tenant. For example, system 70 may statically or dynamically allocate virtual storage (herein abbreviated sometimes as "VS") instances 80, virtual machine (herein abbreviated sometimes as "VM") instances 100, and/or portions of particular storage devices 74 to a particular tenant.

Virtualization is a technology that allows a first computer system to simulate a second computer system. The first computer system, called a virtualization host, is the actual or physical machine that provides resources such as processing power, memory, and access to storage. The second computer system, simulated by and executing on the host, is called a virtual machine or VM. A VM may run an operating system and software applications as if it were an actual machine. When a VM requests a hardware resource, the host intercepts and fulfills the request. A host may run multiple VMs concurrently, and each VM may differ in capabilities and configuration. One VM may emulate a first operating system for a computer, for instance, while a second VM may emulate a second (same or different) operating system for a computer. A VM may simulate almost any sort of computer system or device including general-purpose computers and special-purpose systems such as storage systems or devices.

A virtualization host may run a layer of software called a hypervisor to support one or more VMs. The hypervisor intercepts requests for processor, memory, storage, and other resources from each VM and fulfills the requests through native host resources. A hypervisor may run above an operating system or directly on the underlying host hardware. Lower-level software that provides hardware resources to higher-level software sometimes may be called a kernel. A hypervisor that provides resources to a VM without relying on a distinct, intermediate operating system may be called a kernel-based hypervisor. A host running at least a kernel-based hypervisor and one or more VMs may be called a kernel-based virtual machine environment.

A VM running on a virtualization host does not have direct access to host resources. Instead, the VM can access host resources only through the hypervisor, which therefore may isolate each VM from the other hosted VMs and/or also selected components in system 70 from one another (e.g., isolating network 90 from network 92). In effect, the hypervisor may create a private, protected operating space for each hosted VM and isolate each VM from other VMs on the same host. This protected space sometimes may be called a "sandbox." A sandbox creates security and privacy for resources inside the sandbox. If a VM is running an application program, for example, then the processor and memory allocated to that application enjoys protection against incursion by other VMs. If a VM and its applications rely on conventional shared physical storage, for example, then that storage occurs on physical storage devices that are outside the VM sandbox used to execute the applications. In this conventional example, even though the executing applications are protected, the underlying physical data storage is not.

A VS instance 80 may be a virtualized implementation of a storage device 74 and may include supporting functionality such as network interfaces. A VS instance 80 may comprise one or more virtual storage disks or disk arrays (e.g., a logical storage system or LSS instance 96, described later). A virtual disk array may function as a virtual RAID device. A VS instance 80, functioning as a storage device, may access a virtual disk or disk array, e.g., to open, read, and write data files, as if the virtual storage were actual physical storage. In actuality, the hypervisor 85 may fulfill these access requests by passing them to actual storage on storage system 72. Data reads and writes directed to (addressed to) a virtual disk or disk array by VS instance 80 may pass through the hypervisor 85 to storage system 72 substantially in real time, by indirect reference through hypervisor 85. VS instance 80, above the hypervisor 85 on host 82, may communicate with the hypervisor 85 but not directly with storage system 72. Hypervisor 85 may in effect isolate storage system 72 from second network 92.

Virtual storage may reflect the features and attributes of the corresponding actual storage. For example, an instance of storage information 76 may include data file structures 77, data files 78, tenant and/or guest associations, and other attributes. A data file instance (also referred to as a data file structure instance) 87 (virtual storage) may correspond to a data file structure 77 (actual storage), and a data file instance (also referred to as a data file structure instance) 88 (virtual storage) may correspond to a data file 78 (actual storage). When exporting an instance of storage information 76 to a VS instance 80, each data file structure 77 accordingly may yield a corresponding data file structure instance 87, and each data file 78 may yield a corresponding data file instance 88. An instance of storage information 76 exported to a VS instance 80 thus may preserve its data, structure, metadata, and tenant-guest ownership. In actuality rather than virtuality, data file structure instances 87 and data file instances 88 may be viewed as references passing through hypervisor 85 to the corresponding storage items in storage system 72.

In an embodiment, a particular VS instance 80 may be associated with and/or dedicated to a particular guest. In an embodiment, a particular VS instance 80 may be associated with and/or dedicated to a particular tenant and shared by one or more guests of that tenant, in the manner of a file system shared by co-workers. For example, a VS instance 80 may be a virtualization of all data or selected data associated with a particular tenant and accessible to all guests or selected guests of that tenant, e.g., via a NFS or CIFS file system implemented in VS instance 80.

A VM implementing a VS instance 80 may function as a sandbox that occupies its own protected operating space. The hypervisor 85 in effect grants each VS instance 80 exclusive access to its own resources, denies each VS instance access to resources associated with other VS instances, and protects each VS instance from incursion by other VS instances. Exporting an instance of storage information 76 to a VS instance 80 therefore protects that data, while on VS host 82, from incursion by other guests associated with other VS instances running on the same VS host 82. For example, a first VS instance associated with a first guest cannot access a second VS instance associated with of a second guest because both VS instances are sandboxed by hypervisor 85.

Exporting an instance of storage information 76 to a VS instance 80 also isolates the VS instance 80 and its associated guest from storage system 72. Hypervisor 85 may isolate VS instance 80 from first network 90 and/or storage system 72. Each VS instance 80 obtains storage services via hypervisor 85, not via direct access to the back-end storage system 72. If system 70 includes multiple VS instances 80 that derive from corresponding instances of storage information 76, each with an associated owner, then each VS instance 80 is isolated from the underlying storage system 72. The multiple owners, each isolated from system 72, are isolated from each other. The multiple owners enjoy mutual security and privacy with respect to data storage.

A VS instance 80, which may be a simulation of a storage device 74, may include one or more virtual data storage disks or disk arrays. A virtualized disk obtained by exporting a storage file 95 to a VS instance 80 may be referred to as a storage file instance 96. A logical structure comprising one or more VS file instances 96 as functional virtual storage may be referred to as an LSS instance 98 or LSS instance 98. An LSS instance 98 may be viewed as a logical window, abstracted by hypervisor 85, into an instance of storage information 76, through which the VS instance 80 obtains actual storage, e.g., on behalf of one or more connected VM instances 100.

An LSS instance 98 may be formatted with a file system such as NFS or CIFS. The file system of the LSS instance 98 may differ from the native file system of storage system 72. For example, the LSS instance file system may be selected by the tenant, e.g., to expedite file sharing among guests of the tenant via VS instance 80 and its LSS instance 98.

An LSS instance 98 comprising at least two VS file instances 96 may be configured as a RAID. For example, the data in an instance of a storage information 76 may be divided into stripes, and each stripe may be assigned to a storage file 95. Separately exporting each storage file 95 to VS instance 80 may generate a corresponding set of VS file instances 96. The LSS instance 98 comprising the set of VS file instances 96 may be configured as a RAID based on the underlying striping and may be formatted with a file system. An LSS instance 96 may correspond to an actual RAID in storage system 72 or may be created independent of the structure of actual storage.

A virtual storage host 82 may be a virtualization host that supports one or more VS instances 80 in system 70. In the example of FIG. 4, host 82 may run a hypervisor 85 that supports multiple VS instances, indicated as 80A-N. Although FIG. 4 shows two VS instances, it is understood that a host 82 may support an indefinite number of VS instances. A VS host 82 may include additional hardware and/or software related or unrelated to hypervisor 85 and VS instances 80. For example, a host 82 may run software to allow the administration or coordination of the VS host 82 within system 70. A VS host 82 may be an example of a cloud computing node 10 or a computer system/server 12.

A virtual storage system 84 may comprise one or more VS hosts 82. A system 70 may employ multiple VS hosts 82, e.g., to support multiple VS instances 80 distributed to multiple hosts 82. VS system 84 may be viewed as a subsystem of system 70 that supports and/or coordinates one or more hosts 82. FIG. 4 shows a VS system 84 with only one host 82; it is understood, however, VS system 84 may include an indefinite number of hosts 82. VS system 84 may include additional hardware and/or software. For example, system 84 may run subsystems to coordinate the hosts 82 of VS system 84, e.g., by balancing computational and/or network loads among the available hosts 82.

First network 90 may be a computer network that provides a communication link from storage system 72 to one or more VS systems 84, and thereby to VS hosts 82, and thereby to one or more VS instances 80. Network 90 may include hardware and/or software components, not shown in FIG. 4, to support the transmission of data in either direction between storage system 72 and one or more VS systems 84 and their hosts 82. Network 90 may employ various media, conductors, devices, and protocols. For example, network 90 may employ one or more fiber-optic conductors and the Network File System (NFS) protocol. Network 90 may be a private network, e.g., a network maintained by the operator of system 70 and isolated from direct connections by tenants and other parties.

First network 90, by connecting a storage system 72 and a VS system 84, provides a means of communicating each instance of storage information 76 to a corresponding VS instance 80. In an embodiment, this communication may occur by means of a file-system export—i.e., a mechanism that allows a networked device to share a file or file system with other networked devices. For example, first network 90 may employ the NFS protocol, which offers a file-system export feature. Storage information 76 may be stored as one or more storage files 95, and the mapping to storage files 95 may derive from a logical structure of system 72 such as logical disk or disk array. System 72 accordingly may export each storage file 95 of the storage instance 76, via an NFS export, to a VS instance 80. The exported storage files may pass through hypervisor 85 to the corresponding VS instance 80 and may appear there as corresponding VS file instances 96 of a LSS instance 98. An LSS instance 98 containing two or more VS file instances may be potentially configured as a virtualized RAID.

For example, referring to FIG. 4, storage system 72 may export an instance of storage information 76 to a VS instance 80A via an NFS export 86A as a single storage file 95. After passing through hypervisor 85 to VS instance 80A, the storage file 95 may appear in VS instance 80A as a VS file instance 96A within a LSS instance 98A. The LSS instance 98A may preserve the data file structures 77 of the storage information as data file structure instances 87 and the data files 78 as data file instances 88. For another example, storage system 72 may export an instance of storage information 76 to VS instance 80N as a set of storage files. For example, storage information 76 may reside on storage system 72 in the form of a logical or physical disk array. Storage system 72 accordingly may export the set of disks in the array via a corresponding set of storage files to VS instance 80N via a set of NFS exports 86N. After passing through the hypervisor, the set of storage files may appear as a set of storage file instances 96N within an LSS instance 98N. The array may be formatted as a RAID device, e.g., by striping the data when preparing the storage files 95. For simplicity, FIG. 4 omits the data files instances and data file structure instances within LSS instance 98N, but it is understood that these features may be present within LSS instance 98N.

The structure and formatting of the LSS instance 98N may differ from that of the corresponding storage information 76. For example, a storage information expressed in storage system 72 as a single logical disk formatted in a given file system may be expressed in VS instance 80 as a virtual RAID device formatted in a different file system.

VS instance 80 may treat an LSS instance 98 as a storage drive, for example, to read or write files. Storage resource requests pass from VS instance 80 (a VM) through hypervisor 85 to storage system 72 in the same manner that processor resource requests pass from the VM to the host CPU. The LSS instance 98 may provide a substantially real-time pass through from VS instance 80 to the corresponding storage information 76 of storage system 72. The VS instance 80, by reference to the image or proxy of storage information 76 presented by LSS instance 98, may indirectly read (write) data to (from) the corresponding actual storage information 76 of storage system 72. The scope of the access of a given VS instance 80 is limited to the scope of the exported storage information 72. If a given VS instance 80 and the corresponding storage information are associated with a particular tenant, then that tenant can "see" its own data but not that of other tenants sharing the same storage system 72. The export process, combined with the virtualization of VS instance 80, isolates each tenant to a specified area of storage system 72, protecting the mutual privacy and security of tenants.

In another embodiment, the communication between storage system 72 and VS instance may employ logical unit numbers or LUNs, which are numbers used to identify storage devices addressed through protocols such as SCSI and Fiber Channel, e.g., in SAN storage devices. For example, a single LUN passed by storage system 72 over network 90 to VS host 82 may pass through hypervisor 85 to VS instance 80 as a block device, which may appear within VS instance 80 as a VS file instance 96 of an LSS instance 98. The LSS instance 98 may then be formatted with a file system convenient to the associated tenant. For another example, a set of LUNs may be passed from storage system 72 to a VS instance 80 and appear there as an LSS instance 98 that comprises a corresponding set of VS file instance 96. The LSS instance 98 may be configured and formatted in a manner appropriate to the associated tenant. Aside from the method used to create the LSS instance 98, a VS instance 80 that communicates with storage system 72 via LUNs is similar to a VS instance 80 that communicates via NFS exports.

A virtual machine instance 100 may be a VM that supports a session conducted by a guest user of system 70. For example, a tenant may establish guest accounts for authorized users. Each account may have credentials such as a user name and password, allowing the guest to establish an authenticated connection to system 70, e.g., by entering the credentials in a form on a web site. When the guest logs in, system 70 may assign or create a VM instance 100 (a guest session) through which the guest may obtain services from system 70. For a photo-storage service, for example, the guest's VM instance 100 may provide features that allow the guest to upload/download photos to/from storage system 72. The guest session, implemented via VM instance 100, may be a persistent process assigned to that guest or an ad hoc process created at log in and destroyed at log out.

A guest may establish a connection to system 70 by means of any of a wide range of tangible devices such as personal computers, cell phones, smart phones, tablet devices, personal digital assistants, and so on. A tangible device (not shown) directly operated by the individual guest may function as a thick or thin client. As a thick client, the device may operate as a substantially complete, free-standing computer. The device accordingly may run an operating system and/or applications and may rely on system 70 mainly for data storage. A VM instance 100 in this context may function as a relatively simple gateway for access to remote, cloud-based services.

As a thin client, the tangible device may operate as a terminal, e.g., to support data entry and/or data display and obtain software services from a networked server without running significant local or native applications. A VM instance 100 in this context may function as a networked server or remote execution engine that may run, e.g., an operating system, applications, and so on—and that may in addition rely on storage system 72 for data storage. These architectural examples are only illustrations. A VM instance 100 is a virtual machine and consequently may emulate a wide range of computerized devices on behalf of the associated guest. A VM instance 100 may be a virtual example of a cloud computing node 10, computer system/server 12, or any of the devices 54A-N of FIG. 2.

Because a VM instance 100 is a virtual machine, it may implement the sandboxing techniques discussed in the context of VS instance 80. A VM instance 100 thus may isolate its associated guest session from other VM instances 100 associated with other guest sessions, thereby protecting the mutual security and privacy of each guest. The scope of the sandbox for a VM instance 100 is the computational activity that maintains the associated guest session. The scope of the sandbox for a VS instance 80, in contrast, is the storage-related requests fulfilled via storage system 72. System 70 protects each guest's application-level security and privacy with one VM (the VM instance 100) and storage-level privacy and security with a second VM (the VS instance 80). System 70 therefore protects the privacy of the entire guest session.

A VM instance 100 associated with a particular guest may communicate with a VS instance 80 associated with the same authorized guest. This communication allows the VM instance 100 to obtain storage resources (ultimately from storage system 72) on behalf of the guest. In a photo-storage system, for example, the guest may issue a command to upload a photo file via a VM instance 100 session, which receives the uploaded file and communicates the file to the associated VS instance 80, which communicates the file to storage system 72, which stores the file for that guest and/or tenant. This communication occurs in a secure environment, isolated from the guest by VM instance 100 and from storage system 72 by VS instance 80, maintaining the privacy and security of the session.

A VM host 102 may be an example of a virtualization host adapted to support one or more VM instances 100. VM host 102 may run a VM hypervisor 105 that may support a plurality of VM instances, indicated as 100A-N. Contemplated software for VM hypervisor 105 and for hypervisor 85 includes K Virtual Machine (KVM), VMWare, and IBM Power Hypervisor. A VM host 102 may include additional hardware and/or software related or unrelated to VM hypervisor 105 and VM instances 100. For example, a host 102 may run software to facilitate the administration of the host 102 within system 70, e.g., by balancing computation and/or communication loads among the available hosts 102. A host 102 may be an example of a cloud computing node 10 or a computer system/server 12.

FIG. 4 depicts two VM hosts, indicated as 102A and 102N. It is understood that system 70 may include an indefinite number of VM hosts 102. FIG. 4 depicts an illustrative embodiment that separates VS host 82 and hypervisor 85 from VM host 102 and VM hypervisor 105. In another embodiment, hosts 82 and 102 may reside on the same physical machine and may be supported by the same hypervisor. FIG. 4 is a generalized functional or conceptual illustration of system 70, which may implement the same functional features through other architectures.

A VM host system 104 may comprise one or more VM hosts 102, e.g., to support multiple VM instances 100 distributed to multiple VM hosts 102. VM system 104 may be viewed as a subsystem of system 70 that coordinates one or more hosts 102. FIG. 4 shows a system 104 with two VM hosts 102A and 102N. It is understood that a system 104 may include an indefinite number of VM hosts 102. System 104 may include additional hardware and/or software. For example, system 104 may run subsystems to coordinate the VM hosts 102 of system 104, e.g., by balancing computational and/or network loads among the available hosts 104.

Second network 92 may be a physical or virtual computer network that provides a communication link from a VM host system 104 to a VS system 84. Network 92 allows a VM instance 100 to transmit data to, and receive data from, its associated VS instance 80. Network 92 may include hardware and/or software components, not shown in FIG. 4, to support transmission of data in either direction. Network 92 may employ various media, conductors, devices, and protocols. For example, in an embodiment, a physical network 92 may comprise one or more fiber-optic conductors and the NFS protocol. In another embodiment, network 92 may include the Internet and employ the TCP/IP protocol, e.g., to implement a virtual private network (VPN) to connect a remote VM host 102 to a VS host 82. A tenant may, for instance, maintain an on-premises VM host 102 and export data to an off-premises VS host 82 via network 92.

In an embodiment, second network 92 may be a virtualized network implemented as a VM, similar to a VS instance 80 or a VM instance 100 implemented. One or more instances of a virtualized network 92 thus may run on a hypervisor running on a host. In an embodiment, the virtual network host may differ from the VS host 82 and/or the VM host 102. In an embodiment, one host may support VMs of different types including any combination of VS instances 84, VM instances 100, and virtual network instances 92.

In an embodiment, second network 92 may be a Virtual Local Area Network (VLAN). In a conventional Local Area Network (LAN), the networked devices are located in a single broadcast domain, e.g., on the same network switch, in relatively close physical proximity. A VLAN is a logical emulation of a physical LAN that may include devices in different broadcast domains, e.g., on different switches. A VLAN is defined logically, not physically, so its connected devices may be physically distant. In short, a VLAN is a non-local LAN that may connect, e.g., members of a workgroup residing in physically distant locations. Network 92, implemented as a VLAN, may allow VM instances associated with a given tenant to connect to the same VS instance 80 from a greater range of distances or network topologies.

Second network 92 may include more than one underlying network. For example, as shown in FIG. 4, a first VM host 102A supporting VM instances 100A-C may communicate via a first second network 92A to a first VS instance 80A; while a second VM host 102N supporting VM instances 100D-N may communicate via a second network 92N to a second VS instance 80N. The underlying networks 92A and 92N may differ in type and/or protocol. The assignment of VM instances to networks 92A and 92N may depend on the tenant and/or guest associated with each VM instance. For instance, all communications traffic of first tenant may be routed via a given second network 92A, while all traffic of a second tenant may be routed via a different second network 92N. This tenant-exclusive allocation of resources provides isolation between tenants. For example, placing a VS instance 80 of a given tenant on the same private virtual network 92 as the VM instances 100 of the same tenant—and excluding other tenants from these dedicated resources—provides isolation between that tenant and other tenants.

Second network 92, by connecting one or more VM instances 100 to a VS instance 80, provides a means of communicating the storage information 76 exported to a VS instance 80 to each VM instance 100 connected to the VS instance 80 via second network 92. In an embodiment, this communication may occur by means of a file-system export. For example, second network 92 may employ the NFS protocol. The VS device 80 may, via NFS, export its LSS instance 98 to each connected VM instance 100. The exported LSS instance 98 may pass through the VM hypervisor 105 and appear inside the VM instance 100 as a virtual drive. VM instance 100 may access the virtual drive as a storage device. Storage accesses addressed to that drive pass through it to VS instance 80 and ultimately to storage system 72. For example, if a user of a given VM instance opens a particular data file, then the file-access request passes from the VM instance to the VS instance and ultimately to storage system 72. Excluding network latency, this cascade of accesses may occur substantially in real time. To the end user, the exported file system may appear to be local to VM instance 100. In general, the process of exporting data from storage system 72 to VS instance 80 is similar to the process of exporting data from VS instance 80 to VM instance 100.

An embodiment that exports one or more storage files 95 from the storage system 72 to a VS instance 100 via NFS and also exports from the VS instance to the VM instance via NFS may sometimes be referred to as a "NFS re-exporter." Topologically, this embodiment inserts a VS instance 100 in between a storage system 72 and a VM instance 100, both on NFS networks. In this example, the VS instance 80 may function as a firewall-like device that allows a guest session on a VM instance 100 to access storage system 72 in a private, secure session.

The hypervisor-based VM instances 100 are sandboxed sessions. Although multiple guests may share a common file system through a common VS instance 80, multiple guests on the same VM host 102 are otherwise isolated from each other.

A virtual storage space instance 94 or VSS instance 94 may be an image, assessable to a VM instance 100 via second network 92, of the virtual storage of VS instance 80. For example, if VS instance 80 exports its virtual storage (i.e., its LSS instance 98) to a VM instance 100, then the VSS instance 94 may appear as a logical drive or similar structure. The drive can be referenced by the VM instance 100 to access the virtual storage of VS instance 100, which may in turn pass the request through a LSS instance 98 and hypervisor 85 to storage system 72. A VSS instance 94 may be formatted, e.g., with a file system selected for the convenience of the user of VM instance 100. A VSS instance 94 may be functionally similar to an LSS instance 98. That is, an LSS instance 98 may be considered as a logical window to/from a VS instance 80 to/from actual storage (an instance of storage information) on storage system 72, while a VSS instance 94 may be considered as a logical window to/from a VM instance 100 to/from a VS instance 80. Both a VSS instance 94 and an LSS instance 98 may provide access, abstracted by a hypervisor, into data such as a file system residing on another device (logical or virtual).

A VS instance 80 may create a VSS instance 94 for each connected VM instance 100. For example, in FIG. 4, VS instance 80N has a plurality of connected VM instances 100D-N and a corresponding set of VSS instances 94N, each a VM-specific access mechanism into the VS instance. A VS host or VM host may act as a virtual server for the VSS instances.

Figure 5:
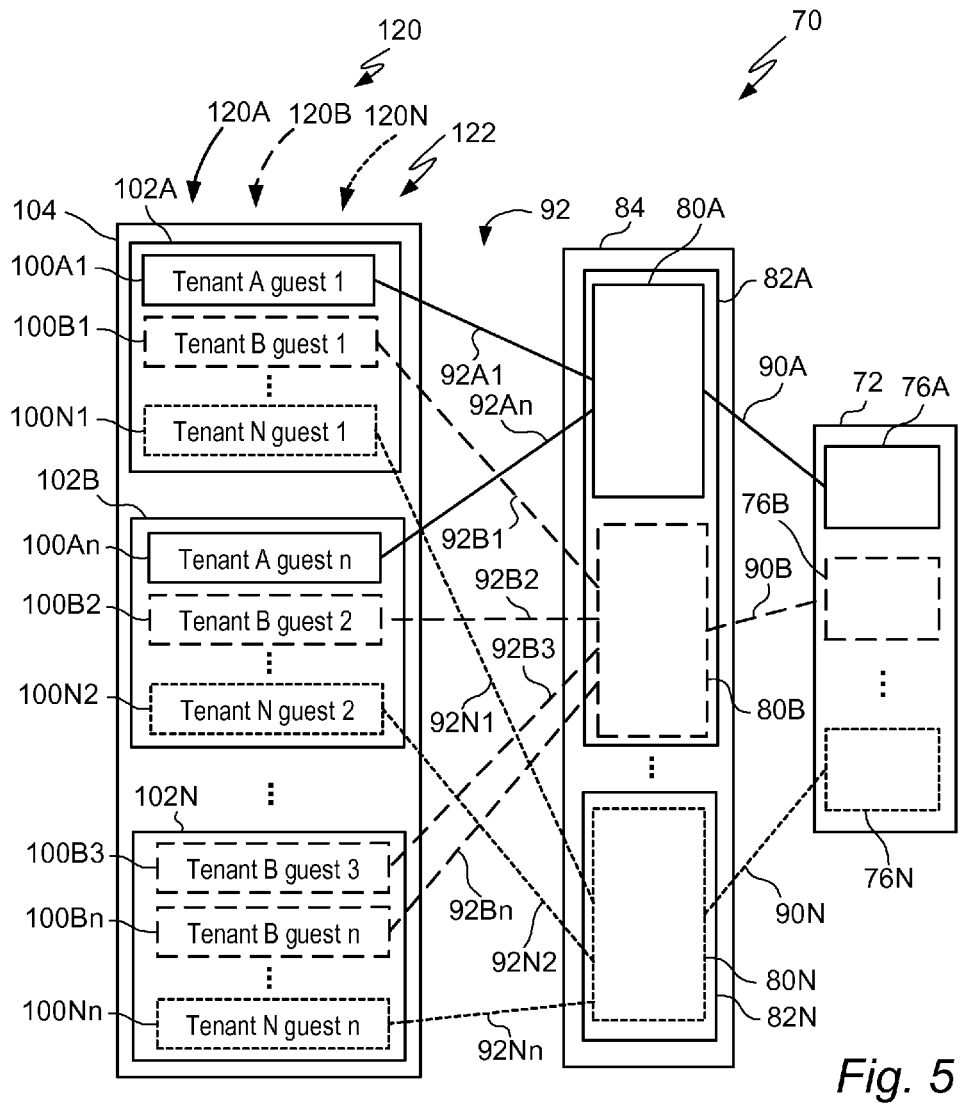
FIG. 5 depicts a representative embodiment of a system for accessing stored information according to the present invention.

Referring now also to FIG. 5, system 70 may support one or more tenants 120; each tenant 120 may include one or more guests 122 associated with and subordinate to that tenant 120; and system 70 may allocate resources such as VS instances 80 and VM instances 100 to tenants and/or guests. In the illustrative example of FIG. 5, a first tenant 120A and its associated resources are indicated by solid lines; a second tenant 120B and its resources, by long-dash lines, and a third tenant 120N and its resources, by short-dash lines. In VM host system 104, a first VM host 102A supports a first VM instance 100A1 for a first guest of tenant 120A, a second VM instance 100B1 for a first guest of tenant 120B, and a third VM instance 100N1 for a first guest of tenant 120N. A second VM host 102B similarly supports a first VM instance 100An for a second guest of tenant 120A, a second VM instance 100B2 for a second guest of tenant 120B, and a third VM instance 100N2 for a second guest of tenant 120N. A third VM host 102N similarly supports further VM instances 100B3, 100Bn, and 100Nn for further guests of tenants 120B and 120N.

The allocation of resources—that is, the mapping of particular tenants and guests to particular VM hosts—may be static or dynamic. For static allocation, predefined resources may be dedicated to predefined tenants and/or guests. For dynamic allocation, resources may be assigned at need, substantially in real time. For example, system 70 may create a VM instance for a particular guest on a selected VM host when the guest logs in, and may destroy the VM instance when the guest logs out. The selection of the VM host for the next-new VM instance may occur automatically, e.g., by selecting the VM host with the lowest computation and/or communication load. A given VM host may concurrently support VM instances associated with different tenants, and a given tenant may have VM instances running on different VM hosts. The correspondence between tenants and VM hosts may change over time; and the individual VM instances may be ephemeral, existing only during the associated guest session. FIG. 5 shows a snapshot of representative allocations at a particular moment in time, e.g., to highlight representative relationships between tenants, guests, and resources.

System 70 may also allocate virtual storage resources on behalf of tenants 120A-N. As shown in FIG. 5, an exemplary VS system 84 may comprise two VS hosts 82A and 82N, each supporting one or more VS instances 80A-N. In the example, tenant 120A corresponds to VS instance 80A; tenant 120B, to VS instance 80B; and tenant 120N, to VS instance 80N. In the example, VS instances 80A and 80B run on a first VS host 82A, and instance 80N runs on a second VS host 82N. This VS host allocation, like that of the VM hosts 102, may be static or dynamic. For instance, system 70 may create a VS instance when needed, e.g., whenever a tenant has at least one active guest session, and destroy it when unneeded, e.g., to release resources.

System 70 may maintain networked communication between the various VM instances 100A1-100Nn via second network 92. In an embodiment, network 92 may comprise one or more VLANs, each an emulated instance of LAN. System 70 may maintain a distinct, independent VLAN for each tenant. For example, first tenant 120A, associated with VM instances 100A1 and 100An, has an associated first VLAN, indicated on a per-guest basis as 92A1 and 92An; second tenant 120B similarly has a second VLAN, indicated as 92B1-92Bn; and third tenant 120N has a third VLAN, indicated as 92N1-92Nn. The multiple VM instances (guest sessions) of each tenant are connected to a common VS instance of that tenant. All guests of the associated tenant thus may have access to the same underlying virtual storage. For first tenant 120A, for example, VM instance 100A1 (first guest) and VM instance 100An (second guest) both connect to the same VS instance 80A. The first and second guest thus may both access (subject to permissions) the same virtual storage, i.e., VS instance 80A.

Although FIG. 5 shows one second network 92 (VLAN) for each tenant, in an embodiment, a tenant may have more than one associated network 92. For example, one VLAN might handle communications for a predetermined set of VM instances and another VLAN might handle communications for a second predetermined set of VM instances. This embodiment splits network 92 into multiple, separate channels for a given tenant, e.g., to balance loads or isolate sub-tenants such as workgroups. A tenant similarly might have more than one associated VS instance. For example, tenant 120A might have multiple associated VS instances, each associated with a portion of tenant 120A's physical storage in storage system 72.

The association between tenants and resources continues into the physical storage system 72. Continuing the example, first tenant 120A has an associated storage information 76A in communication with VS instance 80A via first network 90, indicated separately as 90A; second tenant 120B has storage information 76B in communication with VS instance 80B via network 90B, and third tenant 120N has storage information 76N in communication with VS instance 80N via network 90N. As a result of this per-tenant association between virtual and physical storage, storage-resource requests from a particular VM instance pass to the corresponding storage information in storage system 72. For example, a data file saved thorough VM instance 100A1 of tenant 120A passes to storage information 76A of tenant 120A.

The separation between tenants in the VM host system 104, VS system 84, and storage system 72 maintains the mutual privacy and security of each tenant. For example, the resources exclusively allocated to tenant 120A do not communicate with resources exclusively allocated to tenants 120B-N. Resources associated with tenant 120A are therefore invisible to tenants 120B-N and vice versa.

Figure 6:
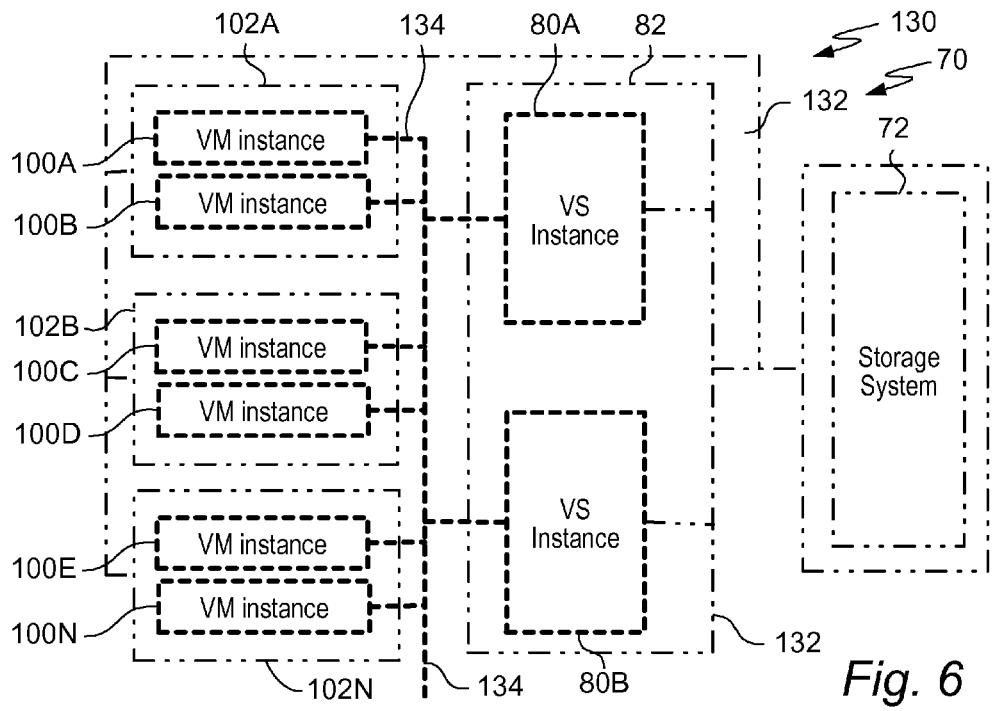
FIG. 6 depicts the network-security architecture of the embodiment of FIG. 5.

With reference now also to FIG. 6, security architecture 130 of system 70 may comprise two zones. First zone 132, indicated by dash-dot-dot lines, includes physical storage system 72, VS host 82, VM host 102, and the communication paths connecting them. First zone 132 accordingly includes the infrastructure of system 70 not accessible to the tenant and guest. Second zone 134, indicated by small-dash lines, includes the tenant- and guest-visible portions of VS instances 80 and VM instances 100. Second zone 134 accordingly includes the public, cloud-accessible side of system 70, where users can see, store, and exchange data.

The bridge between zones 132 and 134 occurs within hosts 82 and 102, "underneath" hypervisor 85 and VM hypervisor 105. The VS and VM instances running above the hypervisors are in second zone 134, sandboxed by the hypervisors. The VS instances and VM instances communicate with first zone 132 only through the hypervisors running on the hosts. The VS instances and VM instances therefore perform indirect, protected accesses to first zone 132 including storage system 72. The use of the sandboxed, intermediate VS and VM instances eliminates the need to directly host the shared physical storage system 72 from the public second zone 132—and therefore eliminates the privacy and security issues that may follow from such direct hosting.

Figure 7:
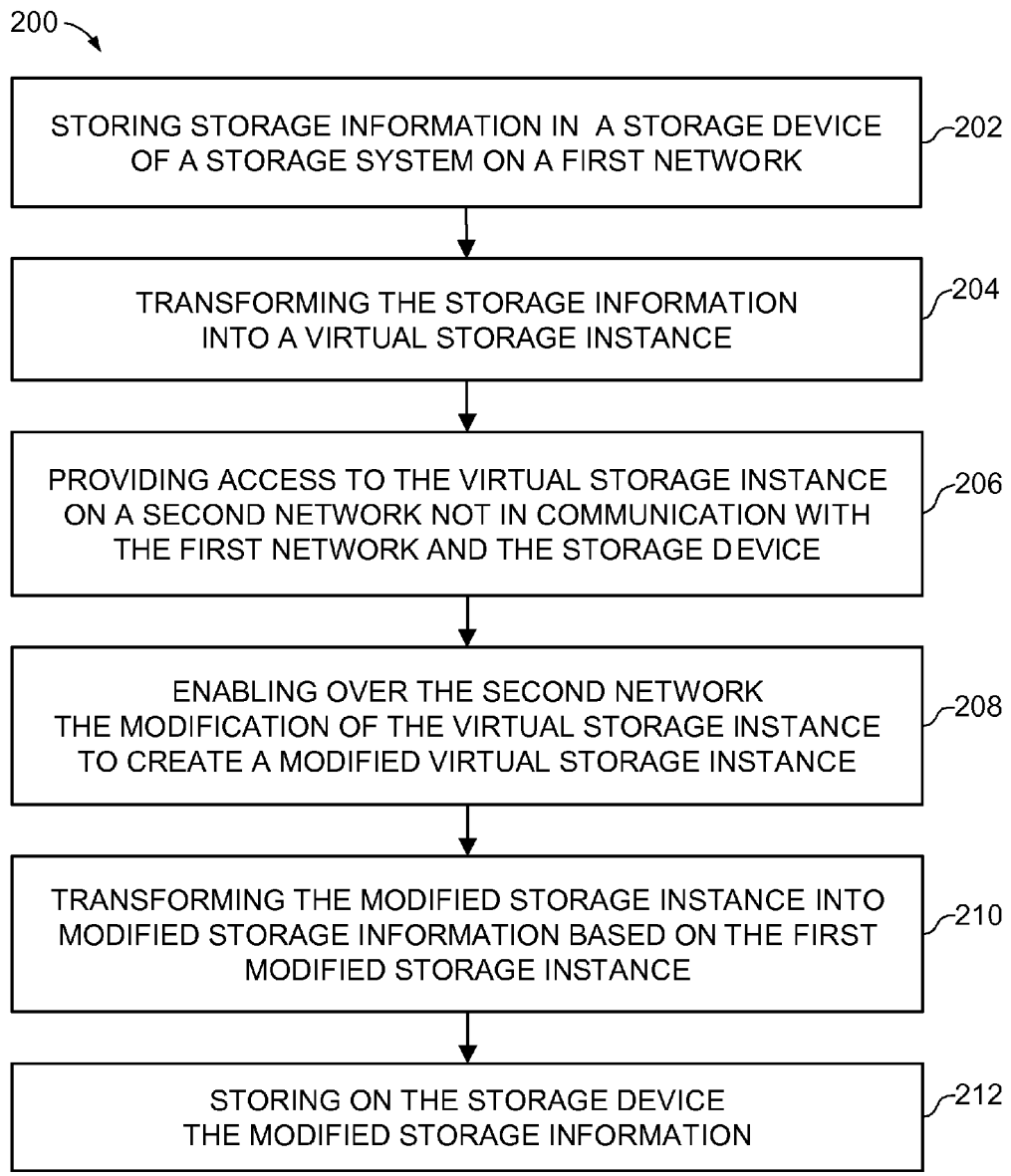
FIG. 7 shows an example of a method for providing secure access to shared storage resources.

Referring now also to FIG. 7, a method 200 for providing secure access to shared storage resources may comprise storing 202 first (or subsequent) storage information in a storage device of a storage system on a first network; transforming 204 the first (or subsequent) storage information into a first (or subsequent) virtual storage instance; providing access 206 to the first (or subsequent) virtual storage instance on a second network not in communication with the first network and the storage device; enabling 208 over the second network the modification of the first (or subsequent) virtual storage instance to create a first (or subsequent) modified virtual storage instance; transforming 210 the first (or subsequent) modified storage instance into first (or subsequent) modified storage information based on the first (or subsequent) modified storage instance; and storing 212 on the storage device the first (or subsequent) modified storage information.

Storing 202 storage information 76 in a storage device of a computer storage system 70 on a first network 90 may include storing one or more data files 78 on storage system 72. The storage information 76 may be associated with a tenant and/or guest of system 70. Storing 202 may further include creating or utilizing logical structures such as logical disks, partitions, volumes, and/or file systems, e.g., to provide an organizational framework within storage information 76 to receive data files 78. For example, the operator of system 70 may allocate storage on storage system 70 for a new tenant and define a logical disk and file system associated with that tenant to receive the data files associated with that tenant.

Transforming 204 storage information 76 into a VS instance 80 may include creating a VS instance 80 on a VS host 82 connected to a first network 90. Transforming 204 may further include establishing communication via network 90 between the VS instance 80 and the storage information 76 and enabling access by VS instance 80 to the storage information 76, e.g., by means of LUNs or NFS exports. The exported storage information 76 may be represented within VS instance 80 as a LSS instance 98, and storage accesses by the VS instance 80 referencing LSS instance 98 may pass or resolve to the storage information via the hypervisor 85 and the network 90. Transforming 204 may include maintaining by hypervisor 85 references between virtual and actual storage. Transforming 204 may include configuring the LSS instance 98, e.g., as a RAID, and/or formatting LSS instance 98, e.g., with a file system. Transforming 204 may include preserving in VS instance 80 the organizational framework (e.g., directory hierarchy), storage units (e.g., data files), and metadata (e.g., tenant ownership) of the storage information 76. The exported storage information 76 thus may generally mirror the structure and content of the underlying storage information 76. This mirroring may be a logical mapping or translation rather than an exact duplication. For example, a tenant-visible file system of VS instance 80 may differ from a native file system of storage system 72. Transforming 204 accordingly may include translating features supported by storage system 72 into corresponding or equivalent features supported by VS instance 80. Transforming 204 may include algorithmic transformations of the data, e.g., uncompressing data stored in compressed format by storage system 72.

In an embodiment, transforming 204 may include transforming the storage information using a hypervisor. For example, a VS host 82 may run a hypervisor 85 to support one or more virtual machines, e.g., instances of VS instance 80. Transforming 204 therefore uses the hypervisor to support a virtual storage device (VS instance 80). In actuality, the hypervisor 85 may translate or map actual logical or physical storage to virtual storage and vice versa.

In an embodiment, transforming 204 may include transforming one or more data files 78 included in an instance of storage information 76 into corresponding data file instances 88 of the associated VS instance 80. Transforming a data file 78 may include translating or converting its content, attributes, and/or properties (e.g., its associated file name, ownership, and permissions) from formats native to storage system 72 to formats implemented by VS instance 80. In actuality, hypervisor 85 may maintain a data file instance 88 as a reference to the corresponding data file 78.

In an embodiment, transforming 204 may include transforming one or more data file structures 77 included in the storage information 76 into corresponding data file structure instances 87 of the associated VS instance 80. For example, the native file system of storage system 72 may implement a hierarchical directory structure including, e.g., directory names, path names, hierarchical relationships, ownership, and permissions. Transforming 204 may include transforming this directory structure to that of the file system of VS instance 80, so that the data file structure instance 87 mirrors the data file structure 77. In actuality, hypervisor 85 may maintain a data file structure instance 87 as a reference to the corresponding data file structure 77.

Providing access 206 to the VS instance 80 on a second network 92 not in communication with the first network 90 and the storage device 74 may include establishing a connection between second network 92 and the VS host 82 that supports the VS instance 80. The process of establishing a connection may depend on the type of network 92 being used. For example, VS host 82 may have a hardware interface such as a network interface card (NIC), and the NIC may have an associated address to allow other networked devices to send/receive data to/from the NIC and thereby to/from the VS host 82. Providing access 206 accordingly may include configuring second network 92, e.g., with data that identifies the VS host 82 and/or the VS instance 80; configuring VS host 82, e.g., with data that identifies network 92 and/or VS instance 80; and/or configuring the VS instance 80 (which is a VM of VS host 82), e.g., with data to allow the VS instance 80 to access network 92 via the supporting VS host 82. In an embodiment, second network 92 may be a virtual network. For example, second network 92 may be a virtual private network (VPN), a virtual local area network (VLAN), or a virtualized network implementation running in a VM and supported by a hypervisor.

Providing access 206 may further include maintaining an absence of direct communication between first network 90 and second network 92. Hypervisor 85, topologically between first network 90 and second network 92, may in effect block direct communication between the two networks. First network 90 is logically on the host side of hypervisor 85 of VS host 82, while second network 92 is logically on the VM side (i.e., on the VS instance side) of hypervisor 85. The sandboxing provided by hypervisor 85 may in effect hide each VS instance from other VS instances on the same VS host 82. This sandboxing may similarly in effect hide from each VS instance 80 the actual or physical resources used by the VS host 82. Each VS instance 80 obtains resources such as storage via hypervisor 85, which acts as a proxy of storage system 72 to fulfill storage access requests. Hypervisor 85 therefore eliminates direct access by VS instance 80 to first network 90 and storage system 72. Both first network 90 and storage system 72 accordingly may be hidden from VS instance 80 and from second network 92 connected to VS instance 80. Second network 92 is not in communication with first network 90 because second network 92 cannot access first network 90 through the VS instance 80 and because the two networks are not otherwise connected.

Enabling 208 over the second network 92 the modification of the VS instance 80 to create a modified VS instance may include allowing any actual or potential change via network 92 to the storage information 76 exported to the VS instance 80. For example, in an embodiment where second network 92 connects a VS instance 80 to a VM instance 100, enabling 208 may include granting the VM instance 100 access to the VS instance 80, e.g., so that the user of the VM instance 100 may actually or potentially obtain data such as a data file via VS instance 80 from the storage information, edit the data, and save the change (ultimately to the storage information) via VS instance 80. Enabling 208 may include any operation or configuration appropriate to allow access via network 92 to VS instance 80 and to its virtualized storage.

In an embodiment, enabling 208 the modification of the VS instance 80 may include enabling modification of the VS instance 80 by a first VM instance 100 and a second VM instance 100, the first and second VM instances not being in communication with the first network 90 and the storage device. A VS instance 80 may represent a file system (i.e., a storage information) owned by a tenant and shared by multiple guests of that tenant. A VS instance 80 accordingly may support connections via second network 92 to multiple VM instances 100, where each VM instance is a session associated with a particular guest of that tenant. Enabling 208 accordingly may include establishing, granting, or configuring network access from a plurality of VM instances to a single shared VS instance 80.

In an embodiment, transforming 210 a modified storage instance into a modified storage information may include preparing, formatting, or translating the modified storage instance for actual storage, e.g., by applying to the modified storage instance the inverse of one or more operations performed by transforming 204. For example, in an embodiment that has a VM instance 100 connected to a VS instance 80, the user of VM instance 100 may access a data file 77, and system 70 may pass the data file through the VS instance to the VM instance. Transforming 204 may occur while the data file is passing from the storage information on storage system 72 through the hypervisor 85 to VS instance 80. In the session of VM instance 100, the user may edit the data file. On saving the edited data file, the VM instance 100 refers to the VS instance 80 for access to storage. The modified data file (i.e., the modified storage information) passes back through VS instance 80 and ultimately to actual storage in storage system 72. Transforming 210 may occur while the modified data file is passing through VS instance 80 to storage system 72. Transforming 210 may invert any operation included in transforming 204. For example, transforming 210 may include writing the modified storage information to storage system 72 through the hypervisor 85, which may map the modified storage information back to the native file system of storage system 72.

Storing 212 on the storage device 74 a modified storage information 76 may include saving the modified storage information of transforming 210 on storage system 72, e.g., by storage on a logical or physical storage device 74 of storage system 72. Storing 212 preserves the modified storage information in the persistent storage information 76 of storage system 72. For example, a data file instance modified within a VM instance 100 may overwrite the corresponding data file in actual storage.

In an embodiment, method 200 may further comprise creating on the second network 92 a VSS instance 94 according to a pre-selected file system, the VSS instance 94 including a VS instance 80. A VSS instance 94 may be an image, assessable to a VM instance 100 via second network 92, of the virtual storage of VS instance 80. Creating the VS storage space instance may include exporting the virtualized file system of the VS instance 80 to the VM instance 100. After passing through the VM hypervisor 104 of VM host 102, the VSS instance 94 may appear as, e.g., a virtual drive within VM instance 100 through which the VM instance 100 may access the virtual storage of VS instance 100. This virtual drive may be formatted, e.g. with a selected file system.

In an embodiment, method 200 may further comprise creating the VSS instance in a kernel-based VM environment. A VSS instance 94 may provide access to the virtual storage of VS instance 80 from a VM instance 100 via network 92. A VSS instance 94 exists in a VM environment, e.g., on VS host 82 running a hypervisor 85. The host of the VSS instance may run a kernel-based hypervisor—i.e., a hypervisor that does not run on top of a separate, independent operating system. The combination of the host, kernel-based hypervisor, and supported VMs may be called a kernel-based VM environment.

In an embodiment, method 200 may further comprise (a) storing an instance of storage information 76 as first and second (or subsequent) storage files 95; (b) transforming these storage files 95 into corresponding storage file instances 96; (c) creating an LSS instance 98 from the storage file instances 96 using a redundant array of independent disks (RAID) protocol; and (d) formatting the storage file instances, e.g., with a file system. Item (a) may include logically segmenting the data in the storage information, e.g., by striping the data for a RAID device and storing the strips as a set of two or more storage files. Item (b) may include applying transforming 204 to each storage file 95. Item (c) may include creating a logical structure comprising the storage file instances 96, the structure being analogous to a disk array subsystem. Item (d) may include formatting the LSS instance 98 with a preselected file system, which may differ from that of storage system 72.

In an embodiment, method 200 may further comprise (e) transmitting via the network file system (NFS) protocol the first and second (or subsequent) VS file instances 96 to a virtual server of the storage system hosting the virtual storage space instance 94; and (f) preventing by a hypervisor communication between the first and second networks. A virtual server may be a VS host 82, a VM host 102, and/or an intermediate server on second network 92 and accessible to the VS instance 80 and to one or more associated VM instances 100 via the VSS instance 94. Item (e) may include configuring NFS exports on storage system 72 to share one or more VS file instance 96 with the host or server of the VSS instance. Item (f) may include the sandboxing provided by hypervisor 85 and/or VS hypervisor 105, which provide abstracted access to storage.

In an embodiment, method 200 may further comprise (g) transmitting the first and second (or subsequent) VS file instances 96 as logical unit numbers (LUNs) and/or as a storage logical unit to a virtual server of the computer storage system hosting the virtual storage space instance, and (h) preventing by a hypervisor communication between the first and second networks. Items (g) and (h) may be functionally equivalent to items (e) and (f), except that communication is established by LUNs and/or the storage logical unit instead of by NFS exports. Items (g) and (h) may be alternatives to items (e) and (f).

In an embodiment, method 200 may further comprise transmitting the VSS instance 94 to a VM instance 100 using a NFS protocol.

In an embodiment, method 200 may further comprise maintaining by a hypervisor isolation between the first network 90 and the second network 92. This isolation may be a result of the sandboxing provided by hypervisor 85 and/or VM hypervisor 105, which provide abstracted access to resources such as storage.

In an embodiment, method 200 may apply to second or subsequent instances of storage information 76, VS instance 80, VM instance 100, and other reference elements. The use of "first" or "second" to describe elements is not in general intended to limit method 200 to only one or two elements of that type.

In an embodiment, method 200 may include creating on the second network 92 a first virtual storage space according to a standard file structure based on the first storage information, the first virtual storage space including the first virtual storage instance, and creating on the second network 92 a second virtual storage space inaccessible in common with the first virtual storage space, the second virtual storage space having a standard file structure being based on the second storage information and including the second virtual storage instance.

In an embodiment, method 200 may further comprise hosting the first virtual storage space on a first virtual local area network and hosting the second virtual storage space on a second virtual local area network not in communication with the first virtual local area network.

Figure 8:
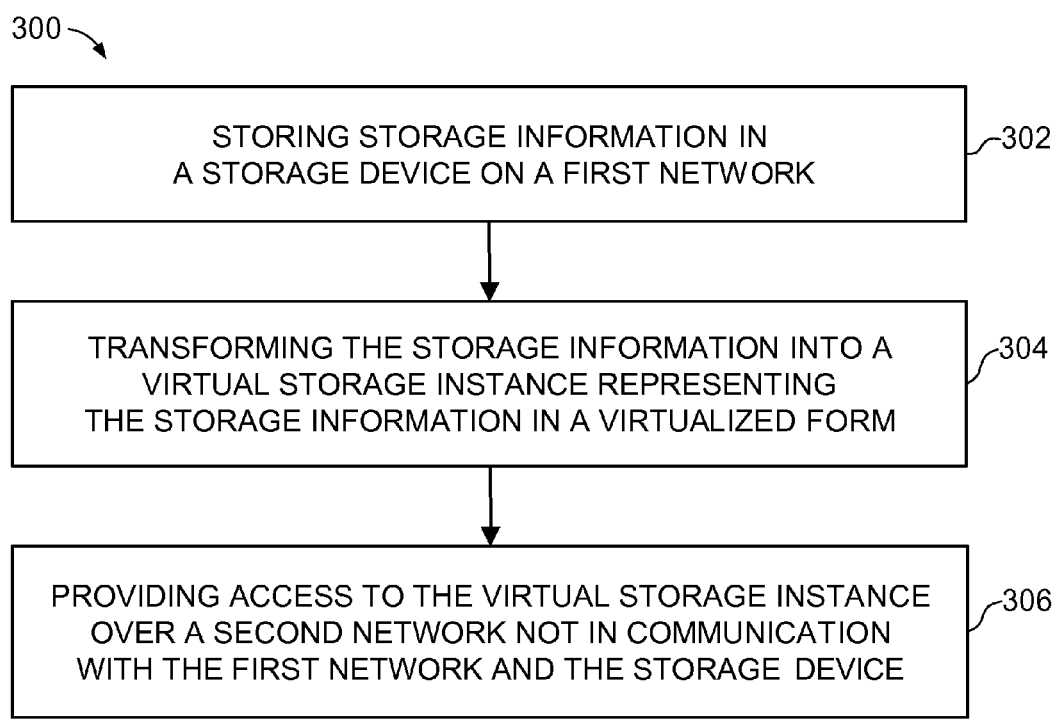
FIG. 8 shows an example of a method for providing secure access to shared storage resources.

Referring now also to FIG. 8, a method 300 for providing secure access to shared storage resources may comprise storing 302 one or more instances of storage information 72 in a storage device 74 on a first network 90; transforming 304 one or more instances of storage information into one or more VS instances 80, each VS instance representing the corresponding storage information 76 in a virtualized form, and providing 306 access to the one or more VS instances 80 over a second network 92 not in communication with the first network 90 and the storage device 74. Storing 302 may be equivalent or similar to storing 202. Transforming 304 may be equivalent or similar to transforming 204, where representing in a virtualized form may refer to the abstracted image of the storage information presented by the hypervisor 85 to the VS instance 80. Providing 306 may be equivalent or similar to providing 206. Method 300 may include other, alternative, or additional elements; may omit one or more elements; and/or may follow a different sequence of elements from that listed.

In an embodiment, providing access 306 to a first VS instance 80 over the second network 92 may include providing access to a first VM instance 100 and a second VM instance 100 that share the first VS instance 80 over a first virtual local area network (VLAN); and providing access to a second VS instance 80 over the second network 92 includes providing access to a third VS instance 80 and a fourth VS instance 80 that share the second VS instance 80 over a second VLAN not in communication with the first VLAN. For example, a first VS instance 80A may provide access to stored data associated with a first tenant 120A, and a second or subsequent VS instance 80B may provide access to stored data associated with a second tenant 120B. One or more guests of the first tenant 120A, each with an associated VM instance, may share access to the first VS instance 80A via a VLAN 92A, and one or more guests of the second tenant 120B, each with an associated VM instance 100, may share access to the second VS instance 80B via a distinct VLAN 92B. VS instances 80A and 80B are not in communication with each other, VLANs 92A and 92B are not in communication with each other, and the various VM instances 100 are also not in communication with each other. The VM instances associated with tenant 120A that are connected to VLAN 92A may share data via VS instance 80A, however, and the VM instances associated with tenant 120B that are connected to VLAN 92B similarly may share data via VS instance 80B.

As should be appreciated, the preceding embodiment(s) is/are for illustrative purposes only. In embodiments, steps may be added or removed, and many steps may be performed at least partly in parallel. Different portions of a digital file, or different related digital files may be processed at the same time or prioritized for speed or transfer purposes. Processes such as searching for multiple patterns within arrays may be performed effectively or actually simultaneously. For example some or all processes may be threaded, using a single processor or multiple processors.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the embodiments in the form disclosed. Many modifications and variations will be apparent to those of ordinary skill in the art without departing from the scope and spirit of the embodiments of the disclosure. The embodiments were chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In an embodiment, the disclosure may be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, and pointing devices) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method comprising:
    storing first storage information in a storage device of a computer storage system on a first network,
    transforming by the computer storage system the first storage information into a first virtual storage instance,
    providing by the computer storage system access to the first virtual storage instance on a second network not in communication with the first network and the storage device, wherein a hypervisor of the computer storage system maintains access isolation between the first and second networks,
    exchanging information between the first and second networks through the hypervisor of the storage system,
    enabling by the computer storage system over the second network a modification of the first virtual storage instance to create a modified first virtual storage instance,
    transforming by the computer storage system the modified first virtual storage instance into modified first storage information based on the modified first virtual storage instance, and
    storing on the storage device the modified first storage information.

2. The method of claim 1, wherein transforming the first storage information includes transforming the first storage information by using the hypervisor of the computer storage system.

3. The method of claim 1, wherein transforming the first storage information includes transforming a data file included in the first storage information into a data file structure instance of the first virtual storage instance.

4. The method of claim 1, wherein transforming the first storage information includes transforming a data file structure included in the first storage information into a data file structure instance of the first virtual storage instance.

5. The method of claim 1, wherein enabling the modification of the first virtual storage instance includes enabling modification of the first virtual storage instance by a first virtual machine instance and a second virtual machine instance, the first and second virtual machine instances not being in communication with the first network and the storage device.

6. The method of claim 1, further comprising creating by the computer storage system on the second network a virtual storage space instance according to a pre-selected file system, the virtual storage space instance including the first virtual storage instance.

7. The method of claim 6, further comprising creating by the computer storage system the virtual storage space instance in a kernel-based virtual machine environment.

8. The method of claim 6, further comprising:
storing the first storage information in the storage device as a first storage file and a second storage file,
transforming by the computer storage system the first and second storage files respectively into a first virtual storage file instance and a second virtual storage file instance,
creating by the computer storage system a logical storage system instance of the first and second virtual storage file instances using a redundant array of independent disks protocol, and
formatting by the computer storage system the first and second virtual storage file instances according to the pre-selected file system of the virtual storage space instance.

9. The method of claim 8, further comprising:
transmitting by the computer storage system using a network file system protocol the first and second virtual storage file instances to a virtual server of the storage system hosting the virtual storage space instance, and
preventing by the hypervisor of the computer storage system communication between the first and second networks.

10. The method of claim 8, further comprising:
transmitting by the computer storage system the first and second virtual storage file instances as a storage logical unit to a virtual server of the computer storage system hosting the virtual storage space instance, and
preventing by the hypervisor of the computer storage system communication between the first and second networks.

11. The method of claim 6, further comprising transmitting by the computer storage system the virtual storage space instance to a virtual machine instance using a network file system protocol.

12. The method of claim 1, further comprising the steps of:
storing second storage information in the storage device different from the first storage information on the first network,
transforming by the computer storage system the second storage information into a second virtual storage instance,
providing by the computer storage system access to the second virtual storage instance on the second network without providing shared access to both the first and second virtual storage instances,
enabling by the computer storage system over the second network the modification of the second virtual storage instance to create a modified second virtual storage instance,
transforming by the computer storage system the second modified virtual storage instance into modified second storage information, and
storing on the first network the modified second storage information in the storage device.

13. The method of claim 12, further comprising:
creating by the computer storage system on the second network a first virtual storage space according to a standard file structure based on the first storage information, the first virtual storage space including the first virtual storage instance, and
creating by the computer storage system on the second network a second virtual storage space inaccessible in common with the first virtual storage space, the second virtual storage space having a standard file structure being based on the second storage information and including the second virtual storage instance.

14. The method of claim 13, further comprising hosting by the computer storage system the first virtual storage space on a first virtual local area network and hosting the second virtual storage space on a second virtual local area network not in communication with the first virtual local area network.

15. The method of claim 1, wherein the second network is a virtual network.

16. A method comprising:
storing first storage information in a storage device of a computer storage system on a first network,
transforming by the computer storage system the first storage information into a first virtual storage instance representing the first storage information in a virtualized form,
providing by the computer storage system access to the first virtual storage instance over a second network not in communication with the first network and the storage device, wherein a hypervisor of the computer storage system maintains access isolation between the first and second networks;
creating, on the second network, in a kernel-based virtual machine environment, a virtual storage space instance that resembles a pre-selected file system, the virtual storage space instance including the first virtual storage instance; and
enabling modification of the virtual storage space instance by a first virtual machine instance, the first virtual machine instance not being in communication with the first network and the storage device.

17. The method of claim 16, further comprising:
storing on the first network a second storage information, different from the first storage information, in the storage device,
transforming by the computer storage system the second storage information into a second virtual storage instance representing the second storage information in a virtualized form, and
providing by the computer storage system access to the second virtual storage instance over the second network, the first and second virtual storage instances not being accessible by the other.

18. The method of claim 17, wherein:
providing by the computer storage system access to the first virtual storage instance over the second network includes providing access to a first machine and a second machine that share the first virtual storage instance over a first virtual local area network, and
providing by the computer storage system access to the second virtual storage instance over the second network includes providing access to a third machine and a fourth machine that share the second virtual storage instance over a second virtual local area network not in communication with the first virtual local area network.

19. A system for accessing stored information, comprising:
at least a first processor;
a memory; and
a program including a plurality of instructions stored in the memory that, in response to selection of an attribute, are executed by the at least first processor to:
store first storage information in a storage device of a storage system on a first network,
transform the first storage information into a first virtual storage instance,
provide access to the first virtual storage instance on a second network not in communication with the first network and the storage device, wherein a hypervisor of the storage system maintains access isolation between the first and second networks,
exchange information between the first and second networks through the hypervisor of the storage system,
enable over the second network a modification of the first virtual storage instance to create a modified first virtual storage instance,
transform the modified first virtual storage instance into modified first storage information based on the modified first virtual storage instance, and
store on the storage device the modified first storage information.

20. The system of claim 19, wherein the plurality of instructions includes instructions that, in response to selection of the attribute, are also executed by at least the first processor to:
store second storage information in the storage device different from the first storage information on the first network,
transform the second storage information into a second virtual storage instance,
provide access to the second virtual storage instance on the second network,
enable over the second network a modification of the second virtual storage instance to create a modified second virtual storage instance,
transform the modified second virtual storage instance into modified second storage information, and
store on the first network the modified second storage information in the storage device.

21. A computer program product for accessing stored information, the computer program product comprising:
a computer readable memory having computer readable program code embodied therewith, the computer readable program code being executable by a processor to:
store first storage information in a storage device of a storage system on a first network,
transform the first storage information into a first virtual storage instance,
provide access to the first virtual storage instance on a second network not in communication with the first network and the storage device, wherein a hypervisor of the storage system maintains access isolation between the first and second networks,
exchange information between the first and second networks through the hypervisor of the storage system,
enable over the second network a modification of the first virtual storage instance to create a modified first virtual storage instance,
transform the modified first virtual storage instance into modified first storage information based on the modified first virtual storage instance, and
store on the storage device the modified first storage information.

22. The computer program product of claim 21, wherein the computer readable code is also configured to create on the second network a virtual storage space instance that resembles a pre-selected file system and includes the first virtual storage instance, the virtual storage space being created in a kernel-based virtual machine environment.

23. The computer program product of claim 22, wherein the computer readable code is also configured to enable modification of the virtual storage space instance by a first virtual machine instance, the first virtual machine instance not being in communication with the first network and the storage device.

24. A computer program product for accessing stored information, the computer program product comprising:
a computer readable memory having computer readable program code embodied therewith, the computer readable program code being executable by a processor to:
store first storage information in a storage device of a storage system on a first network,
transform the first storage information into a first virtual storage instance,
provide access to the first virtual storage instance on a second network not in communication with the first network and the storage device,
create on the second network a virtual storage space instance that resembles a pre-selected file system and includes the first virtual storage instance, the virtual storage space being created in a kernel-based virtual machine environment,
enable modification of the virtual storage space instance by a first virtual machine instance, the first virtual machine instance not being in communication with the first network and the storage device,
enable over the second network a modification of the first virtual storage instance to create a modified first virtual storage instance,
transform the modified first virtual storage instance into modified first storage information based on the modified first virtual storage instance, and
store on the storage device the modified first storage information.

* * * * *